United States Patent [19]

Hope et al.

[11] Patent Number: 4,816,357

[45] Date of Patent: Mar. 28, 1989

[54] INTENSIFICATION OF ION EXCHANGE IN LITHIUM BATTERIES

[76] Inventors: Henry F. Hope; Stephen F. Hope, both of 2421 Wyandotte Rd., Willow Grove, Pa. 19090

[21] Appl. No.: 125,193

[22] Filed: Nov. 25, 1987

[51] Int. Cl.$^4$ .......................... H01M 6/18; H01M 4/62
[52] U.S. Cl. ..................................... 429/192; 429/212; 429/218
[58] Field of Search ................ 429/192, 191, 218, 212

[56] References Cited

U.S. PATENT DOCUMENTS 4,578,326  3/1986  Armand et al. ..................... 429/192

FOREIGN PATENT DOCUMENTS 0156673  12/1981  Japan ..................................... 429/191
2157066  10/1985  United Kingdom ................ 429/192

Primary Examiner—Donald L. Walton
Attorney, Agent, or Firm—Z. T. Wobensmith, III

[57] ABSTRACT

The contact area of the anode of lithium batteries with the electrolyte is substantially increased by deposition of minute lithium particles on the anode base layer to form an irregular layer in contact with the electrolyte which reduces the manufacturing cost and increases the contact area which increases the ion exchange between the lithium particles and the electrolyte.

7 Claims, 1 Drawing Sheet

INTENSIFICATION OF ION EXCHANGE IN LITHIUM BATTERIES

BACKGROUND OF THE INVENTION

1. Field of the Invention

This invention relates to ion exchange intensification in lithium batteries by increasing the anode contact area with the electrolyte.

2. Description of the Prior Art

Lithium and some other electrochemical devices or batteries whether they be of the liquid or solid state type characteristically use anodes formed from layers of metal. In lithium batteries for example it is common to form the anode by depositing a foil of lithium onto a base foil of nickel or other metal.

Lithium is a very difficult material to work with, it must be kept from water, it can be highly toxic to those exposed to it, and it also has a low melting point and corrodes upon contact with the air.

It is known in the manufacture of plates for lead acid batteries to form a paste containing particles of lead and a carrier material. The lead composition is then applied to a grid and allowed to dry, which produces plates having cavities therein which increases the electrolyte contact area and improves performance. The manufacture of such plates is described in the publication entitled Lead Acid Batteries by Hans Bode, published by John Wiley & Sons, New York, N.Y. 1977, Pages 102-244. While plates having the described characteristics are produced by the paste method, this method can not be used with lithium due to its considerably different nature, and the required handling characteristics.

In the prior art approach to forming the anode of lithium batteries, lithium is extruded or rolled into thin sheets, which are then mechanically pressed against a base foil to form the anode. With the multi stage handling required it is difficult to prevent the lithium from becoming contaminated, and due to its inherent characteristics it is difficult to bond the lithium with the base foil so that the resultant product is often not satisfactory and separations may occur.

The surface of extruded or rolled lithium foil is relatively smooth and flat, and after fabrication various layers of electrolyte and cathode materials are deposited thereon to form an electrochemical cell or device, which can be of the type described in our prior U.S. Pat. No. 4,576,883.

During battery operation ions are exchanged between the electrolyte and the lithium layer of the anode in contact therewith. The ion exchange is limited by the contact area between the lithium foil and the electrolyte. While the advantages of lithium batteries are well known the difficulties in their manufacture and the cost/efficiency have limited their acceptance. The need exists for a better method of manufacturing the anodes, and a more efficient anode in terms of cost and performance.

SUMMARY OF THE INVENTION

It has now been found that the structural soundness and the contact area for ion exchange between the anode and electrolyte in lithium batteries may be considerably increased by the use of a novel anode construction. In particular, the invention is directed towards converting lithium into minute particles and depositing the particles on the base layer of an anode whereby the deposited particles form one or more porous layers onto which the electrolyte is placed with a resultant contact area substantially greater than that obtained with the conventional flat contact surface.

DESCRIPTION OF THE DRAWINGS

The nature and characteristic features of the invention will be more readily understood from the following description taken in connection with the accompanying drawings forming part hereof in which.

Figure 1:
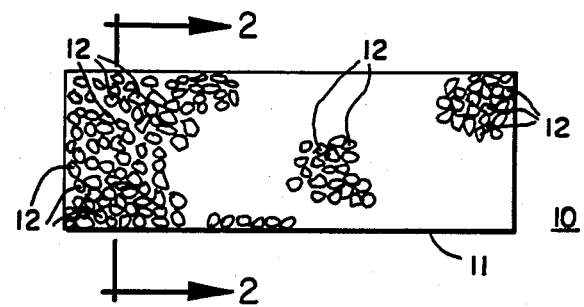
FIG. 1 is a top plan view of a lithium battery anode constructed in accordance with the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

A lithium battery of the solid state type consists of at least an anode layer, a cathode layer and a polymer dielectric layer. The three-layer structure, in the form of a sheet, roll tape, etc. forms a simple cell or battery. Such structures can also employ various additional layers, including current conducting backing layers, insulating layers, and/or bipolar electrode connections. Such simple batteries may be connected or combined in stacks to form multicell electrochemical devices.

The cathode and electrolyte layers may be produced from the appropriate polymer film using the well known so-called "doctor-blade" technique, wherein a solution of the polymer (or polymer compounded with inorganic material) is prepared in a suitable solvent and cast as a film onto a sheet, for example, of waxed paper which passes beneath a fixed reservoir positioned at one end of a flat platform. The front face of the reservoir is adjustable in height and the setting of the gap between the doctor-blade and the paper sheet determines the thickness of the cast film. Evaporation of the solvent causes a uniform reduction in film thickness by an amount which is dependent on the concentration of the solution.

The polymeric electrolyte composition can be formed by compounding a lithium salt and a polymeric material such as a polyethylene oxide. The mixture may be deposited as a film directly onto the cathode layer of the cell by the doctor-blade technique referred to previously. This leads to good reproducibility of the electrolyte layer, which is optimally in the order of 25 micrometers. The cathode layer may be formed of a thin layer of polymer spheres which contain an active cathode material such as vanadium oxide at their core which is encapsulated with a conductive polymer of well known type. As described in our prior U.S. Pat. No. 4,567,883 such material is formed into an emulsion and applied as a thin film to the appropriate substrate layer by the doctor-blade technique as previously described.

The anode layer customarily used in prior art lithium batteries was composed of a lithium or lithium/aluminum metal foil mechanically bonded to a base metal layer such as nickel.

Referring now more particularly to the drawings the anode layer 10 of the battery is shown with a base layer 11 which is of any suitable metal with nickel being a preferred material, and which has a plurality of particles 12 of lithium thereon.

The anode layer is prepared by fabricating the base layer 11 by any well known technique such as extruding, casting or rolling. The base layer 11 is then placed in a chamber (not shown) that has had the humidity removed so that it is as close to zero as possible.

Lithium is melted and while molten is deposited onto the layer 11 in very small droplets or particles 12, 12A, 12B and 12C and which is applied as the base layer passes beneath the deposition structure. The lithium may be formed into particles 12, 12A, 12B and 12C by any suitable means such as, for example, by the airless paint spraying technique whereby molten lithium is fed onto a rotating cone disc (not shown) from which it is discharged in fine mist or droplet form. The molten lithium retains its shape as it falls from the sprayer onto the layer of nickel 11 and forms a layer 13. The droplets 12, 12A, 12B and 12C of lithium bond to the nickel layer 11, and may also bond to each other.

The droplets 12 are illustrated as being of spherical shape, the droplets 12A are of triangular shape, the droplets 12B are of square shape and the droplets 12C are of irregular shape. The sizes and configuration of the droplets are dictated by the desired product and their characteristics will be apparent to any person skilled in the art.

Figure 2:
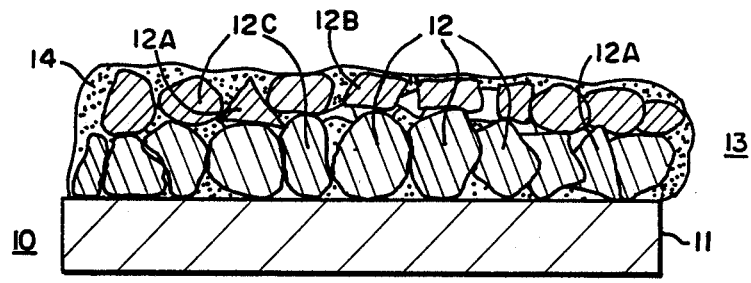
FIG. 2 is a vertical sectional view enlarged taken approximately on the line 2-2 of FIG. 1.

Polymer electrolyte may then be applied to the layer 13 to form a layer 14 onto which additional layers (not shown) may be placed as required. The resultant structure as shown in FIG. 2 is an irregular porous layer where it is apparent that there exists sufficient space between the particles 12, 12A, 12B and 12C for the electrolyte layer 14 to penetrate and to contact them forming an electronic network or grid through and across the anode.

It will thus be seen that the desired characteristics have been achieved.

We claim:

1. In a solid-state lithium battery of the type comprising a lithium composite anode, a polymeric electrolyte, and a cathode, the improvement comprising:
    an anode having a base metal layer,
    a multiplicity of lithium particles on said base metal layer, a plurality of which are in fused adherent contact with said metal layer and all of which are in electrical and mechanical contact with each other, with spaces therebetween forming an irregular porous layer on said base metal layer for contact with said electrolyte whereby ion exchange therebetween is intensified.

2. The battery as described in claim 1 wherein said lithium particles are formed by melting lithium to form micro particles which are discharged to be deposited on said base metal layer forming said anode.

3. The battery as described in claim 1 in which said particles are of spherical shape.

4. The battery as described in claim 1 in which said particles are of triangular shape.

5. The battery as described in claim 1 in which said particles are of square shape.

6. The battery as described in claim 1 in which said particles are of irregular shape.

7. The battery as described in claim 1 wherein said base metal layer is nickel.

* * * * *